May 7, 1963  S. E. SWASEY ET AL  3,088,498
LEAD-WIRE FEEDING APPARATUS
Original Filed Aug. 24, 1954  7 Sheets-Sheet 5

INVENTORS
SAMUEL E. SWASEY
LAWSON J. WARD
BY Joseph C. Ryan
ATTORNEY

May 7, 1963  S. E. SWASEY ET AL  3,088,498
LEAD-WIRE FEEDING APPARATUS
Original Filed Aug. 24, 1954  7 Sheets-Sheet 7

INVENTORS
SAMUEL E. SWASEY
BY LAWSON J. WARD
Joseph C. Ryan
ATTORNEY

United States Patent Office 3,088,498
Patented May 7, 1963

3,088,498
LEAD-WIRE FEEDING APPARATUS
Samuel E. Swasey, Edgemere, Marblehead, and Lawson J. Ward, Danvers, Mass., assignors, by mesne assignments, to Sylvania Electric Products Inc., Wilmington, Del., a corporation of Delaware
Original application Aug. 24, 1954, Ser. No. 451,786. Divided and this application Aug. 29, 1958, Ser. No. 757,993
4 Claims. (Cl. 140—71.6)

This invention relates to the manufacture of sealed electrical devices, such as lamps, radio tubes and the like, which are provided with lead-wires for the establishment of electrical connections from outside the sealed devices to one or more elements inside the devices. More particularly, this invention relates to the manufacture of the stems of sealed electrical devices and to an apparatus for feeding lead-wires during this manufacturing operation.

In the manufacture of stems for electric lamps, for example, flares, lead-wires and exhaust tubes are usually fed to the heads of the stem machine at certain stations thereon and then carried through a plurality of operating stations where the lead-wires and the exhaust tubes are sealed to the flares. Feeding of the lead-wires to the heads of the stem machine is usually accomplished by a finger which selects a lead-wire from a supply thereof and deposits it in a chute which directs the wire to a head of the machine. A specific example of a lead-wire feeding device is shown and described in U.S. Patent 2,637,144 issued May 5, 1953.

Although lead-wire feeding devices of this type have usually been considered satisfactory for many applications, the time consumed in the selection of one lead-wire from a supply thereof and effectuation of its transfer to a head of the stem machine properly positioned thereon, is a substantial factor in the determination of the maximum speed at which the stem machine can be operated satisfactorily. Another limitation encountered in the use of a lead-wire feeding device of this type is the diameter of the flare. Since the lead-wires and the exhaust tube must be positioned accurately both with respect to one another and with respect to the flare within which they are disposed for the stem manufacturing operations, this orientation becomes more difficult as the diameter of the flare decreases. Thus high speed operation with flares of very small diameter presents a very substantial problem in so far as lead-wire feeding is concerned.

Accordingly, therefore, an object of this invention is to operate a stem making machine at speeds substantially higher than heretofore attainable.

Another object is to manufacture stem type lamp mounts of a size substantially smaller than have been manufacturable heretofore on presently known stem making machinery.

A further object is to provide an apparatus for the attainment of the foregoing objects.

A further object is to provide a stem making machine with an apparatus for loading and positioning thereon a wire approximately equal in length to two lead wires.

A further object is to provide a stem making machine with an apparatus for loading and positioning thereon a wire approximately equal in length to two lead-wires, and an apparatus for subsequently cutting said wire to thereby define two lead-wires.

These and other objects, advantages and features are attained, in accordance with the principles of our invention, by providing a stem making machine at what is normally the lead-wire loading station, with a wire feeding apparatus and a wire shaping and loading apparatus. The wire feeding apparatus comprises means for unwinding from a supply of wire a length of wire approximately equal in length to two lead-wires and presenting it to the wire shaping and loading apparatus. The wire shaping and loading apparatus comprises a die with a wire receiving surface thereon and a punch which is engageable with the wire intermediate the latter's ends and preferable at the longitudinal center, and which is movable with respect to the die to push the wire therethrough and into a flare on a head of the stem machine. The stem machine is further provided, at a station subsequent to the station or stations at which a stem press is formed in the flare, with a wire cutting device which severs the bight which was formed in the aforesaid wire during the wire loading operation, to thereby define two separate lead-wires sealed in the stem press.

A specific embodiment of the apparatus of this invention illustrating its application to the manufacture of stems for photoflash lamps is described below in conjunction with the accompanying drawings in which.

Figure 1:
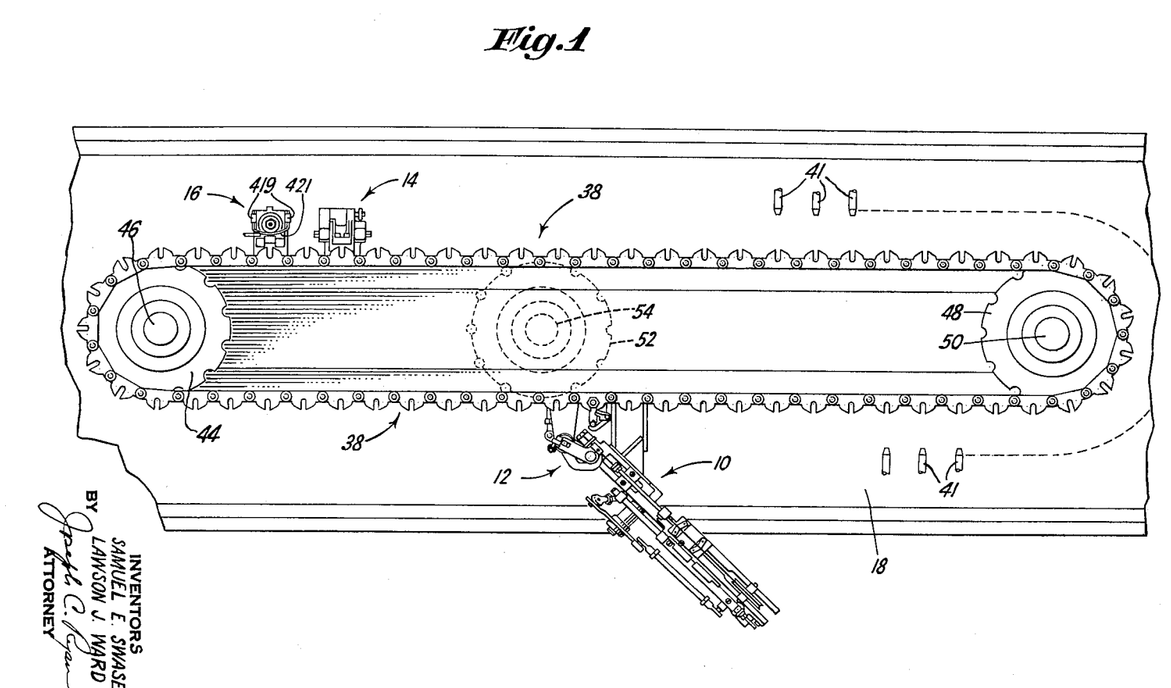
FIGURE 1 is a plan view of the lead-wire feeder, the lead-wire loader, the lead-wire shaper, and the lead-wire cutter, showing their relative location on a stem machine with which they may be employed.

Referring now to the drawings, particularly FIGURE 1 thereof, the specific embodiment of the apparatus of this invention is shown associated with the stem making machine of U.S. Patent 2,637,144. Lead-wire feeder 10 and lead-wire loader 12 are located at one of the stations on this machine; lead-wire shaper 14 is located at another of the stations; and lead-wire cutter 16 is located at still another of the stations.

Figure 2:
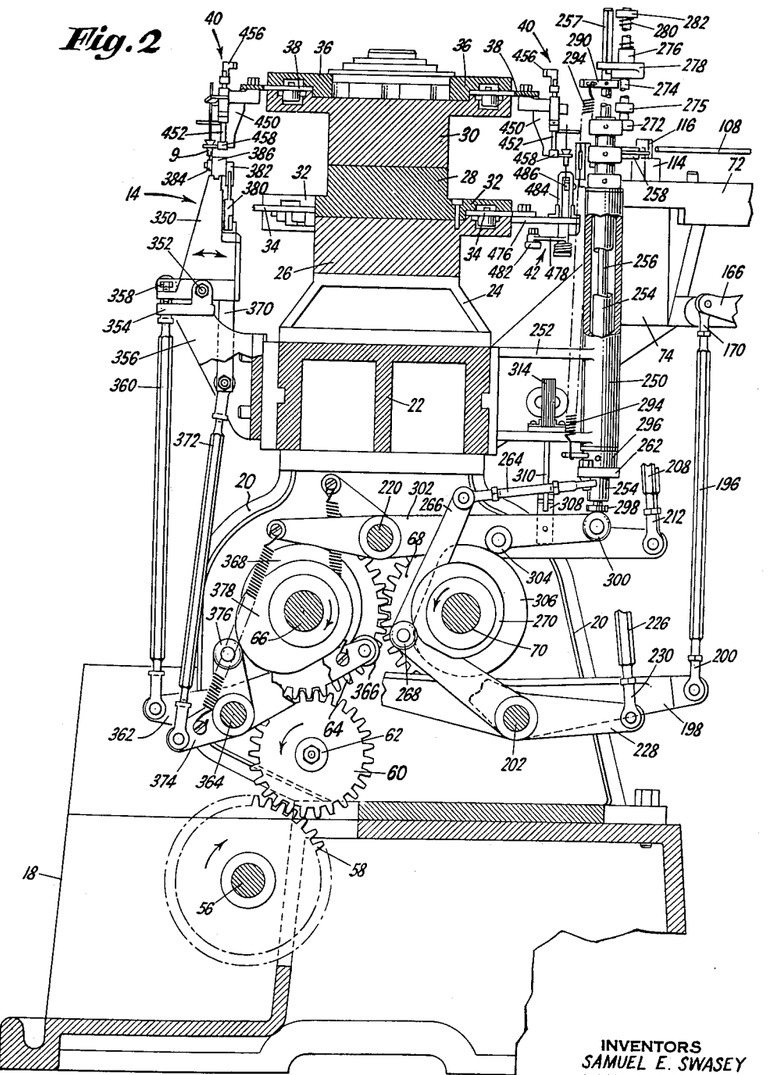
FIGURE 2 is a vertical section taken through the stem machine of FIGURE 1 showing the lead-wire loader, the lead-wire shaper, and their drive mechanisms in elevation.
Figure 3:
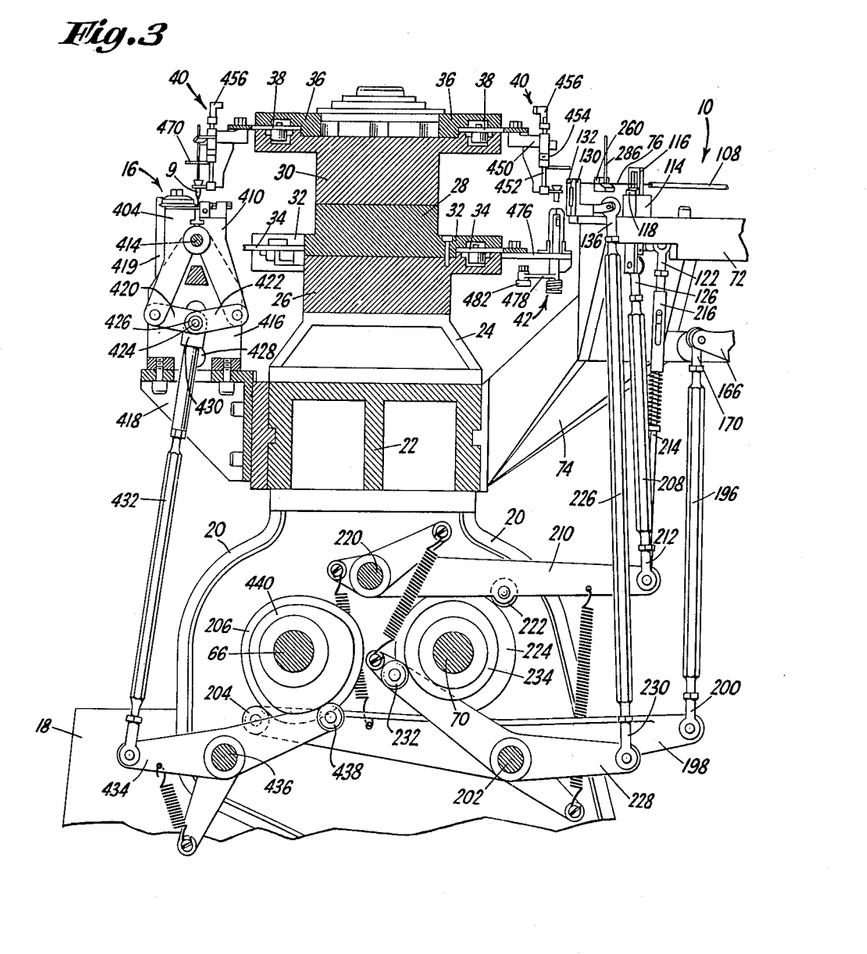
FIGURE 3 is a vertical section taken through the stem machine of FIGURE 1 showing the feeding end of the lead-wire feeder, the lead-wire cutter, and their drive mechanisms in elevation.

That portion of the above-mentioned stem making machine shown in the accompanying drawings, particularly FIGURES 1, 2 and 3 thereof, comprises a base 18, standards 20 mounted on the base 18, and rail 22 mounted on standards 20. Standard 24, mounted on rail 22, supports lower chain frame 26, spacer 28, and upper chain frame 30. A pair of lower chain guards 32 are mounted on lower chain frame 26 and, in conjunction therewith, define a path through which lower conveyor chain 34 travels. Similarly, a pair of upper chain guards 36 are mounted on upper chain frame 30 and, in conjunction therewith, define a path through which upper conveyor chain 38 travels. The upper conveyor chain 38 has a plurality of stem heads 40 mounted thereon; and the lower conveyor chain 34 has a plurality of weld blocks 42 mounted thereon. Each stem head and its cooperating weld block constitutes a work-supporting unit which carries the several stem components assembled therein to a plurality of stations at which various stem making operations are performed. The upper conveyor chain 38 is driven by drive sprocket 44 (FIG. 1) mounted on conveyor chain drive shaft 46, the chain 38 extending around idler sprocket 48 mounted on idler shaft 50 located at the other end of the machine. The lower conveyor chain 34 is driven by a drive sprocket (not shown) mounted on drive shaft 46 and disposed beneath and in register with drive sprocket 44. The lower conveyor chain 34 extends around idler sprocket 52 mounted on idler shaft 54. The conveyor chain drive shaft 46 is driven through suitable means (not shown), such as the means shown in U.S. Patent 2,637,-144 for example, by the main drive shaft 56 (FIG. 2). The drive for actuating the several stem machine work feeding and fabricating units is also taken from the main drive shaft 56. Drive gear 58, mounted on drive shaft 56, meshes with idler gear 60 mounted on idler shaft 62. Idler gear 60 meshes with gear 64 mounted on cam shaft 55; and gear 64 meshes with gear 68 mounted on cam shaft 70. Cam shafts 66 and 70 have a plurality of cams mounted thereon which actuate the several stem machine work feeding and fabricating units.

Figure 4:
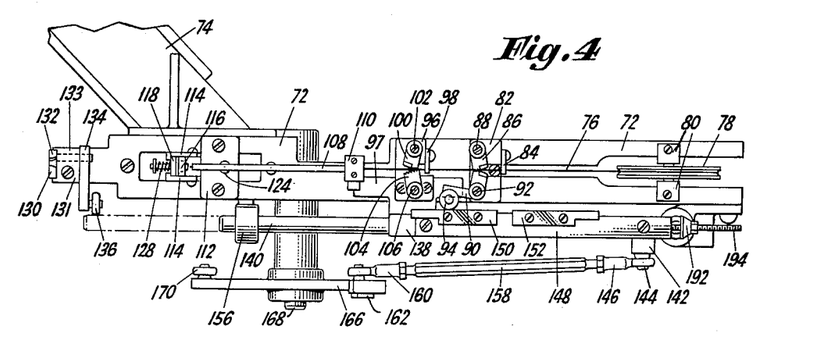
FIGURE 4 is a plan view of the lead-wire feeder.
Figure 5:
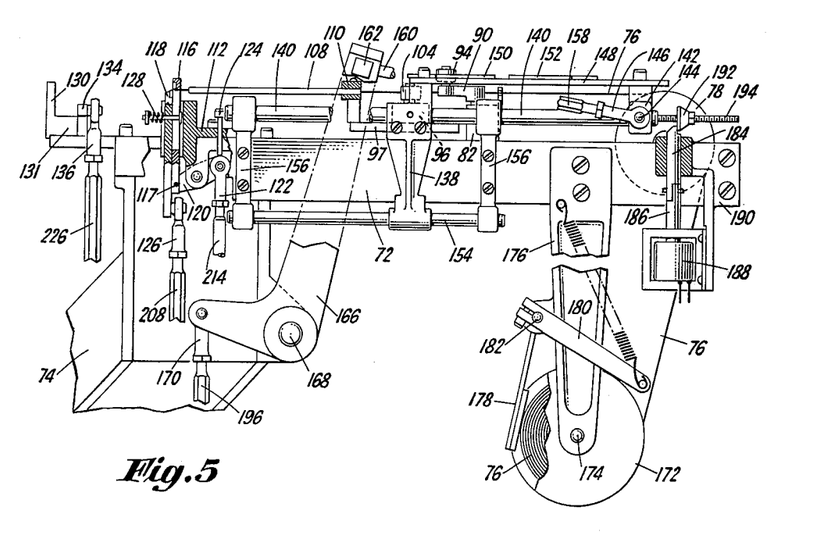
FIGURE 5 is a side elevational view of the lead-wire feeder.

The lead-wire feeder 10 will now be described, reference being made particularly to FIGURES 4 and 5. The base member of the lead-wire feeder is a support plate 72 mounted on bracket 74 which is attached to rail 22 of the stem making machine. Wire 76 is fed around pulley 78 which is supported in bearings 80 at one end of the support plate 72. Jaw mounting block 82, which is mounted on support plate 72, has a wire guide plate 84 mounted on a face thereof, the wireguide plate having an aperture therein through which wire 76 is threaded. Jaw 86 is pivotally mounted on jaw mounting block 82 at 88. Jaw 90, which is an L-shaped member, is pivotally mounted on block 82 at 92, and is provided with a cam roller 94.

Jaws 86 and 90 are spring-loaded to exert a positive force on the wire 76 to effect a gripping thereof when jaw 90 is actuated by cam follower 94 as described more fully below. Jaw mounting block 96, which is mounted on movable platform 97, has a wire guide plate 98 mounted on a face thereof, the wire guide plate having an aperture therein through which wire 76 is threaded. Jaw 100 is pivotally mounted on jaw mounting block 96 at 102. Jaw 104 is pivotally mounted on the block 96 at 106. Jaws 100 and 104 are spring loaded to exert a positive force on the wire 76 to effect a feeding thereof as explained more fully below. Snout 108, through which wire 76 is threaded, is mounted in block 110 which is mounted on movable platform 97. Cutter support 112, which is mounted on support plate 72, has a pair of gibs 114 mounted thereon, within which upper cutter 116 and lower cutter 118 are slidably disposed. Upper cutter 116 is provided with a pin 117 which rides in a slot (not shown) in cutter lever 120 (FIG. 5) which is fulcrumed in cutter support 112. Rod end 122 is connected to the cutter lever 120 at the other end thereof. Stop screw 124, which extends through cutter support 112, is engageable during operation of the cutters by cutter lever 120. Lower cutter 118 is pivotally connected to rod end 126. Upper cutter 116 and lower cutter 118 are maintained in frictional engagement with one another by spring-loaded pin 128. Stationary jaw 130 is fixedly mounted on block 131 on support plate 72, and movable jaw 132 is fixedly mounted on one end of pin 133 which extends through and is rotatable in block 131. Lever 134 connects the other end of pin 133 to rod end 136.

As was mentioned above, jaw mounting block 96 on which jaws 100 and 104 are mounted, and block 110 in which snout 108 is mounted, are mounted on movable platform 97. Movable platform 97 is a lateral extension of carrier 138 which is pinned to drive rod 140 intermediate the ends thereof (FIG. 5). Block 142 mounted on an end of drive rod 140 has a pin 144 extending laterally therefrom, by means of which drive rod 140 is connected to rod end 146. Cam support plate 148 is fixedly mounted near one end thereof on block 142 and near the other end thereof on carrier 138. Bar cams 150 and 152 are mounted on cam support plate 148. The lower extremity of carrier 138 rides on guide rod 154 supported at its extremities in brackets 156 attached to a side face of support plate 72. Drive rod 140, on which carrier 138 is mounted, extends through and is reciprocable within the brackets 156. Connecting rod 158 connects rod end 146 to rod end 160 which is attached to slide block 162. Slide block 162 is disposed on one arm of bellcrank lever 166. Bellcrank lever 166 is pivotally mounted at 168 on a face of bracket 74, and has a rod end 170 connected to the other arm thereof.

Reel 172 (FIG. 5), on which a supply of wire 76 is wound, is supported on spindle 174 in supporting arm 176 depending from support plate 72. Brake shoe 178 is maintained in frictional engagement with the wire 76 wound on reel 172 by the spring loaded arm 180. The spring loaded arm 180 and the brake shoe 178 are mounted on pin 182 which is fulcrumed in reel supporting arm 176.

Means are provided for temporarily locking the lead-wire feed apparatus in its retracted position when this is so desired. This means comprises a latch 184 which is attached to an end of a plunger 186 of solenoid 188 mounted on support bracket 190, the latch 184 extending through and being reciprocable within bracket 190. The free end of latch 184 is engageable with stop nut 192 on stud 194 projecting from an end of drive rod 140. The solenoid 188 is connected to a suitable flare detector (not shown) disposed at a station preceding the wire feeding station.

The mechanism for actuating the above-described lead-wire feeder will now be described, reference being made particularly to FIGURES 3, 4 and 5. As was mentioned above, carrier 138 is mounted on drive rod 140 and drive rod 140 is connected to bellcrank lever 166 through block 142, pin 144, rod end 146, connecting rod 158, rod end 160 and slide block 162. Connecting rod 196 connects bellcrank lever 166 to lead-wire feed cam lever 198 through rod ends 170 and 200. Cam lever 198 is fulcrumed on lever shaft 202 and is provided with a cam roller 204 which rides on lead-wire feed cam 206 mounted on cam shaft 66 (FIG. 3).

As was mentioned above, lower cutter 118 (FIG. 5) is pivotally connected to rod end 126. Connecting rod 208 (FIGS. 3 and 5) connects the lower cutter 118 to cutter cam lever 210 through rod ends 126 and 212. Upper cutter 116 (FIGS. 3 and 5) is connected to cutter cam lever 210 through pin 117, cutter lever 120, rod end 122, spring-loaded connecting rod 214, sleeve 216, and a rod end immediately behind rod end 212. Cutter cam lever 210 is fulcrumed on lever shaft 220 and is provided with a cam roller 222 which rides on cutter cam 224 mounted on cam shaft 70.

As was mentioned above, movable jaw 132 (FIG. 4) is mounted on pin 133, and lever 134 connects pin 133 to rod end 136. Connecting rod 226 (FIG. 3) connects lever 134 to jaw cam lever 228 through rod ends 136 and 230. Jaw cam lever 228 is fulcrumed on lever shaft 202 and is provided with a cam roller 232 which rides on movable jaw cam 234 mounted on cam shaft 70.

The lead-wire loader 12 (FIG. 1) will now be described, reference being made particularly to FIGURES 2, 6, 7 and 8. Referring first to FIGURE 2, the base member of the lead-wire loader 12 is a support tube 250 attached to bracket 252 which is mounted on rail 22 of the stem making machine. A tube 254 extends through support tube 250; and shaft 256 extends through tube 254. The upper end of tube 254 has an arm 258 attached thereto, on which die 260 (FIG. 6) is mounted. The lower end of tube 254 is provided with a drive arm 262 pinned thereto. Connecting rod 264 connects the tube drive arm 262 to the die cam lever 266 which is fulcrumed on lever shaft 202. Die cam lever 266 is provided with a cam roller 268 which rides on die cam 270 mounted on cam shaft 70.

Arm 272 (FIGS. 2 and 6) is clamped to the upper end of tube 254 above arm 258, and has a rod 274 mounted thereon. Collar 275, which is pinned to rod 274, supports a deflector 277. Bushing 276 of arm 278 is slidably disposed on rod 274. Spring 280 is disposed on rod 274 between bushing 276 and collar 282 which is pinned to rod 274. The arm 278 has a punch supporting block 284 attached to one end thereof, punch 286 being pinned to and depending from block 284. The other end of arm 278 is bifurcated and engages the flattened portion 257 of shaft 256 which extends therethrough. Stop plate 290, which is clamped to shaft 256, has a stop screw 288 upstanding thereon, the screw 288 extending freely through an aperture therefor in arm 278, and the lower end thereof being engageable with arm 272. Arm 278 has a stop screw 292 depending therefrom and engageable with stop plate 290. Spring 294 connects stop plate 290, which is clamped to shaft 256, to collar 296 (FIG. 2) which is clamped to tube 254. Adjusting screw 298 (FIG. 2), which is threaded into the lower end of shaft 256, rides on cam roller 300 which is supported on one end of punch cam lever 302. Punch cam lever 302 is fulcrumed on lever shaft 220. Cam roller 304, which is supported on lever 302, rides on punch cam 306 mounted on cam shaft 70.

Means are provided for temporarily locking the punch 286 in its retracted position when this is so desired. This means comprises a catch 308 (FIG. 2) mounted on punch cam lever 302 and engageable with latch 310 which is connected to the plunger of solenoid 314 mounted on a shelf of bracket 252. The solenoid 314 may also be connected to the flare detector mentioned above, so that the punch also may be rendered inactive when no flare is present in the stem head to which a length of the wire 76 would normally be fed.

Figure 11:
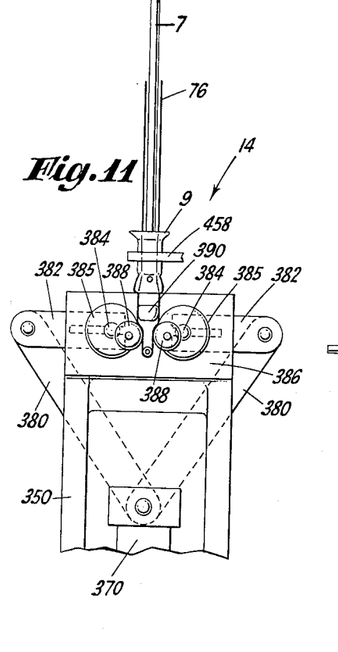
FIGURE 11 is a fragmentary front view of the lead-wire shaper.

Lead-wire shaper 14 will now be described, reference being made particularly to FIGURES 1, 2 and 11. Lead-wire shaper 14 comprises a standard 350 supported on pivot screws 352 in saddle 354 on bracket 356 which is attached to rail 22. The base of standard 350 has a stop screw 358 extending therethrough and engageable with saddle 354. Connecting rod 360 connects standard 350 to cam lever 362. Cam lever 362, which is mounted on lever shaft 364, is provided with a cam roller 366 which rides on cam 368 mounted on cam shaft 66.

Slide 370, which rides in a channel therefor in standard 350, is connected at its lower end through connecting rod 372 to cam lever 374. Cam lever 374, which is mounted on lever shaft 364, is provided with a cam roller 376 which rides on cam 378 mounted on cam shaft 66. A pair of links 380 are each pivotally connected at one end thereof to the upper end of slide 370. A pair of arms 382 are each pivotally connected at one end thereof to the other end of each of the links 380 respectively. The other end of each of the arms 282 has a spindle 384 clamped thereto, the spindles 384 extending through and being rotatable within block 386 mounted on top of standard 350. The head 385 of each of the spindles 384 has an eccentrically mounted roller 388 rotatably pinned on the face thereof. A spacer pin 390 is mounted on block 386 and lies between the heads 385 of spindles 384.

Figure 12:
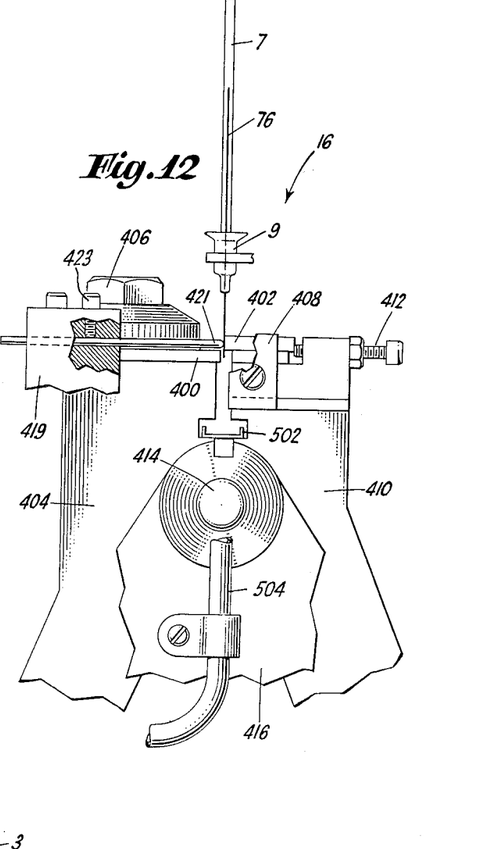
FIGURE 12 is a fragmentary side elevational view of the lead-wire cutter.

The lead-wire cutter 16 will now be described, reference being made particularly to FIGURES 1, 3 and 12. The lead-wire cutter 16 comprises a pair of cutter members 400 and 402 which are moved into and out of engagement with the work. The cutter member 400 is attached to the top of a lever 404 by screw 406. The cutter member 402 is supported in a clamp 408 mounted on the top of a lever 410. Screws 412, which extend through the upper portion of lever 410 to the rear of clamp 408, engage the cutter member 402 and provide a means for effecting adjustment of the position of the cutter member 402 laterally. Levers 404 and 410 are fulcrumed on pin 414 which is supported in the sides of the cutter supporting frame 416. Cutter supporting frame 416, which is mounted on bracket 418 which is attached to rail 22, has a pair of plates 419 attached to the sides thereof, a guide wire 421 being attached at its ends to the top edges of the plates 419 by screws 423 (FIG. 12). The lower end of each of the levers 404 and 410 is connected to one end of links 420 and 422 respectively. The other end of each of the links 420 and 422 is supported on guide pin 424. The extremities of guide pin 424 are provided with guide rollers 426 which ride in slots 428 provided therefor in the sides of the cutter supporting frame 416. Guide pin 425 is pinned to clevis 430. Connecting rod 432 connects clevis 430 to cam lever 434. Cam lever 434, which is fulcrumed on lever shaft 436 is provided with a cam roller 438 which rides on cutter cam 440 mounted on cam shaft 66. Tray 502 (FIG. 12) is mounted on cutter supporting frame 416 to receive the bight of wire 76 which is severed therefrom by cutters 400 and 402. Tubing 504, which is also attached to cutter supporting frame 416, is connected to a source of air under pressure which blows the bights clear from tray 502 and into a suitable receptacle therefor (not shown).

Figure 10:
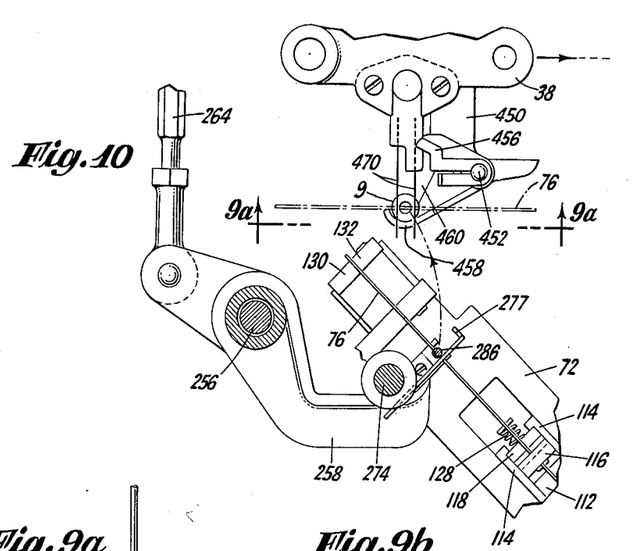
FIGURE 10 is a fragmentary plan view illustrating the relative location of the lead-wire feeder, the lead-wire loader, and the head of the stem machine to which the lead-wire is transferred.

A stem head 40 of the type shown in U.S. Patent 2,637,144, will now be described, reference being made particularly to FIGURES 2, 3 and 10. Each stem head 40 comprises a body member 450 attached to the upper conveyor chain 38, and a shaft 452 supported within the body member 450 by collar 454 which is pinned to shaft 452. Spring loaded lever 456 is clamped to shaft 452 near one end thereof and flare holder arm 458 is pinned to shaft 452 near the other end thereof. Plate 460 (FIG. 10), attached to body member 450, has flare holder jaws formed in an edge thereof, the jaws cooperating with arm 458 to hold a flare therebetween. A pair of resilient fingers 470, which serve as lead-wire spreaders, are attached to body member 450.

A weld block 42, similar to the type shown in U.S. Patent 2,637,144, will now be described, reference being made particularly to FIGURES 2, 3, 9a, 9b and 9c. Each weld block 42 comprises a weld block support plate 476 fixedly mounted on the lower conveyor chain 34, and a spring loaded weld block arm 478 rotatably disposed on a rod pinned to plate 476 and depending therefrom. The weld block arm 478 is provided with a cam roller 482 which, when it moves into engagement with a track or cam, effects rotation of weld block arm 478. Weld block plate 488, which is mounted on weld block arm 478, has a lead-wire stop 486 mounted on the inside face thereof. Weld block plate 484 is mounted on weld block support plate 476. The inner face of weld block plate 488, which engages the inner face of weld block plate 484, is provided with an aperture (not shown) to receive lead-wire 76.

The operation of the above-described apparatus will now be described, reference being made particularly to FIGURES 3, 4 and 5. Wire 76 is unwound from reel 172 and advanced to the wire transfer and loading mechanism by jaws 100 and 104 (FIG. 4), which are mounted on jaw mounting block 96 on movable platform 97 of carrier 138. Carrier 138 is pinned to drive rod 140 which is driven by bellcrank lever 166 through connecting rod 158. Bellcrank lever 166 is driven by the lead-wire feed cam 206 (FIG. 3) through cam lever 198 and connecting rod 196.

During the feeding stroke of the carrier 138, that portion of wire 76 which lies between jaws 100 and 104 which move with the carrier, and jaws 86 and 90 which are mounted on jaw mounting block 82 on fixed support plate 72, is stretched. Stretching of the wire is effected when jaws 86 and 90 grip the wire with sufficient force to temporarily overcome the feeding action of jaws 100 and 104, insofar as unwinding wire from reel 172 is concerned, while the jaws 100 and 104 continue forward in their feeding stroke. This is accomplished by cam follower 94 on jaw 90 and bar cams 150 and 152. As long as the cam follower 94 is riding on bar cams 150 and 152, the wire 76 is free to move between jaws 86 and 90. However, as the carrier 138 moves forward to effect an advancement of wire 76 by jaws 100 and 104, the bar cams 150 and 152 move therewith. Thus when bar cam 150 moves past cam follower 94, the cam follower drops off of bar cam 150 and into the space between bar cams 150 and 152, and then rides up onto bar cam 152. During this period when the cam follower 94 is riding off of one bar cam and onto the other, the cam follower 94 effects a gripping of the wire 76 by the jaws 86 and 90.

Advancement of wire 76 by the wire feeding jaws 100 and 104 causes the free end of the wire to move with the snout 108 (FIGS. 4 and 5) through the space between wire cutters 116 and 118 (FIG. 6) and into position to be gripped by jaws 130 and 132. As soon as the free end of wire 76 has passed between jaws 130 and 132, movable jaw 132 is closed to effect a gripping of the wire. Closing of movable jaw 132 is effected by movable jaw cam 234 (FIG. 3) through jaw cam lever 228, connecting rod 226, lever 134 (FIGS. 5 and 6) and pin 133.

With the free end of the wire now held by jaws 130 and 132, the return stroke of carrier 138 is effected. When the carrier 138 starts back, the load placed on the jaws 100 and 104 to grip the wire 76 and advance it during the feeding stroke is relieved and the jaws slide along the wire. As the carrier 138 starts back, the lead-wire transfer and loading apparatus 12 moves into position to receive wire 76, die 260 (FIG. 6) moving under and into wire-receiving relationship as soon as snout 108 has moved past the point at which the die 260 engages the wire. The die 260, as may be noted in FIGURES 6, 7 and 8, has a transverse groove 261 into which the wire 76 snaps when the die 260 moves into engagement with the wire. The die 260 is also provided with an aperture 263 through which the wire 76 is caused to pass when it is transferred to a head of the stem machine.

Figures 6, 7, 8:
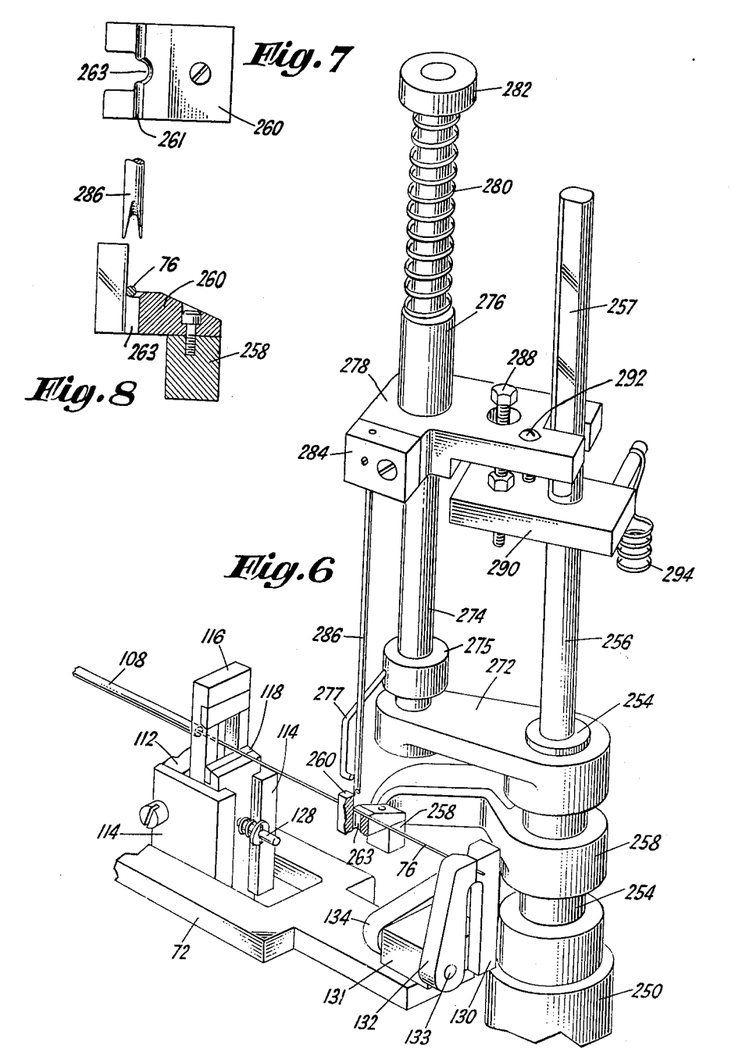
FIGURE 6 is a fragmentary perspective view of the lead-wire feeder and the lead-wire loader looking from the inside of the stem machine.
FIGURE 7 is a plan view of the die of the lead-wire loader.
FIGURE 8 is a vertical sectional view through the center of the die of the lead-wire loader, showing a wire thereon and a portion of the punch which is engageable with the wire.

FIGURE 6 shows the relative location of the front end of the wire feeding apparatus and the wire transfer and loading apparatus at this point of time in the operating cycle. The punch 286, which is disposed above and in register with aperture 263 in die 260, now moves down into engagement with wire 76. The downward stroke of punch 286 is effected by punch cam 306 (FIG. 2) through punch cam lever 302, adjusting screw 298 and shaft 256, on the one hand; and by loaded spring 280 (FIG. 6) through bushing 276 of arm 278 to which punch supporting block 284 is attached, on the other hand. As the shaft 256 moves downwardly under the influence of punch cam 306, the stop plate 290 which is attached to shaft 256 tends to draw away from engagement with stop screw 292 depending from arm 278. However, since the spring 280 is loaded at this point of time, the spring 280 exerts a force downwardly on the arm 278 and tends to keep the stop screw 292 depending from arm 278 in engagement with stop plate 290. Thus the spring 280, through arm 278 moves the punch 286 downwardly into engagement with wire 76.

With the wire 76 now held at two points, i.e., by the jaws 130 and 132, and by the punch 286 and die 260, the wire 76 is cut from the wire supply by cutters 116 and 118. Actuation of the cutters 116 and 118 is effected by cutter cam 224 (FIG. 3) through cutter cam lever 210 and connecting rods 208 and 214, the connecting rod 208 being connected directly to lower cutter 118 (FIG. 5) and the connecting rod 214 being connected to upper cutter 116 through cutter lever 120. As soon as the wire has been severed, the jaws 130 and 132 release their grip on the wire, thus completely releasing the cut segment of wire to the punch 286 and die 260 for transfer and delivery to a head of the stem machine.

Figure 9A:
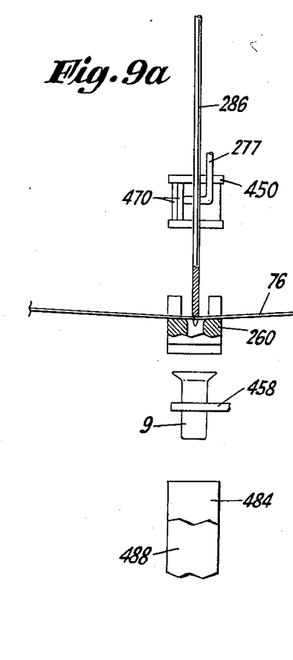
FIGURES 9a, 9b and 9c are fragmentary details in elevation showing the wire loading progression.
Figure 9B:
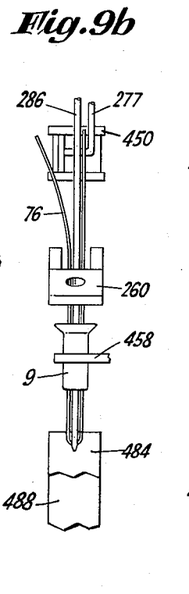

The wire 76, held on die 260 by punch 286 is transferred to a position above and in register with a stem machine head (FIG. 10) by the die cam 270 (FIG. 2) through die cam lever 266, connecting rod 264, tube drive arm 262 and tube 254, to which the arm 258 which carries the die 260 is attached (FIG. 6). Since the arm 272 (FIG. 6) is also attached to tube 254, the punch 286 travels with the die 260, and holds the wire 76 in position during the transfer operation. As the die and punch move into wire delivery position, deflector 277 (FIG. 10) moves into engagement with the resilient fingers 470 which serve as wire spreaders and move them out of the way for delivery of the wire 76 to the stem machine head (FIGS. 10, 9a and 9b). With the fingers 470 displaced, the punch 286 now moves downwardly, pushing the wire 76 through aperture 263 in die 260 and into and through flare 9, the flare 9 having been fed to stem head 40 by a suitable flare feeding apparatus such as that shown in U.S. Patent 2,637,144 for example. The flare 9 is held on the stem head 40 by flare holder arm 458. The downward stroke of the punch 286 is effected by the same mechanism described above in the description of the downward movement of punch 286 into its initial engagement with wire 76.

Figure 9C:
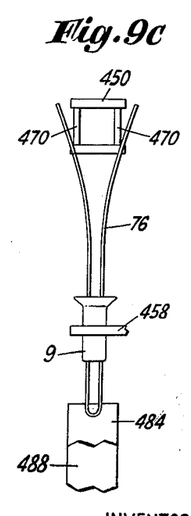

As the punch 286 moves downwardly, the walls of the die 260 which define aperture 263, and the inside wall of the flare 9 effect a deformation of the substantially straight wire into a substantially U-shaped configuration (FIGS. 9b and 9c). At the end of the downward stroke of the punch 286, the bight of the substantially U-shaped wire 76 lies between the adjacent faces of weld block plates 484 and 488, the plate 488 having been swung open by cam follower 482. The return stroke of the punch 286 and the return stroke of the die 260 are then effected. While the lead-wire transfer and loading apparatus is returning to receive another wire, the wire-feeding mechanism 10 is feeding another length of wire. Thus when the transfer and loading apparatus has returned to the position shown in FIGURE 6, the wire feeding mechanism has already advanced another segment of wire into position as also shown in FIGURE 6.

With the wire 76 and flare 9 disposed as shown in FIG. 9c, i.e., with the weld block plates 484 and 488 closed with respect to one another and with the bight of the wire 76 resting on stop 486 and lying in the aperture therefor in weld block plate 488, the stem machine then carries this assembly to a subsequent station where an exhaust tube is fed thereto by some suitable mechanism, such as that shown in U.S. Patent 2,637,144 for example. Conventional stem manufacturing operations are then performed on the work. The flare is heated to a plastic state by burners 41 (FIG. 1) and the stem press is formed to effect a sealing of the wire 76 therein. When the lower conveyor chain 34 carries the weld block 42 around the idler sprocket 52 (FIG. 1), the weld block 42 becomes disengaged from the work, as described in U.S. Patent 2,637,144, and the work is then supported entirely by a stem head 40 (left side of FIGS. 2 and 3).

When the work reaches the station at which the lead-wire shaper 14 (FIG. 1) is located, shaping of the substantially U-shaped wire 76 is effected. As is shown in FIGURE 2, standard 350, which is pivoted on pivot screws 352, is swung into operating position with respect to the work by cam 368 through cam lever 362 and connecting rod 360. The eccentrically mounted rollers 388 (FIG. 11) on the heads 385 of spindles 384 shape the wire 76 as shown when the spindles 384 are rotated. Rotation of the spindles 384 is effected by cam 378 (FIG. 2) through cam lever 374, connecting rod 372, slide 370, links 380 (FIG. 11) and arms 382 which are clamped to the spindles 384.

Figure 13:
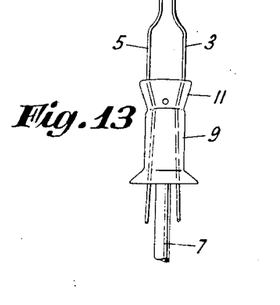
FIGURE 13 is a detail of a completed stem.

At a subsequent station on the stem machine, the bight of the wire 76 is severed therefrom to define a pair of lead-wires 3 and 5 as shown in FIGURE 13. Severing of the bight is effected by the wire cutter 16 (FIGS. 1, 3 and 12). Referring particularly to FIGURES 3 and 12, when the work reaches the wire cutting station, levers 404 and 410, which carry cutters 400 and 402 respectively, and which are fulcrumed on pin 414, move the cutters into engagement with the wire 76. Levers 404 and 410 are actuated by cutter cam 440 (FIG. 3), through cam lever 434, connecting rod 432, clevis 430, guide pin 424 and links 420 and 422 which are connected to levers 404 and 410 respectively. Since, as may be noted in FIG. 12, the guide wire 421 slightly overlies cutter 400, when the cutters 400 and 402 start to back away from one another after severing the bight of the wire, the guide wire 421 momentarily exerts a force on the newly formed lead-wires 3 and 5 sufficient to overcome any sticking tendency which might exist, and thereby helps prevent deformation of the lead-wires.

The completed stem as shown in FIGURE 13, having been fabricated as described above, is now ready for the mounting of a filament thereon. Although we have shown and described the operation of the wire cutting apparatus 16 as taking place prior to the filament mounting operation, we have found that in many cases the wire cutting operation may be performed after the filament mounting operation if desired.

This application is a division of our co-pending application, Serial Number 451,786 filed August 24, 1954 and now abandoned.

What we claim is:

1. Apparatus for unwinding wire from a supply thereof comprising: a base member; wire-gripping jaws, between which said wire extends, mounted on said base member, said wire-gripping jaws normally being open with respect to the wire extending therebetween; wire-receiving jaws mounted on the other end of said base member for receiving the free end of said wire; a slide reciprocably mounted on said base member; wire-feeding jaws, between which the wire extends, mounted on said slide, said wire-feeding jaws being located between said wire-gripping jaws and said wire-receiving jaws; means for advancing said slide whereby said wire-feeding jaws mounted thereon advance the wire held therebetween and present the free end thereof to said wire-receiving jaws; and means, actuated by and during the advancement of said slide, for momentarily closing said wire-gripping jaws on the wire extending therebetween whereby the advancement of said wire through said wire-gripping jaws is momentarily retarded and the segment of wire between the wire-gripping jaws and the wire feeding jaws is thereby stretched.

2. Apparatus for unwinding wire from a supply thereof comprising: a base member; wire-gripping jaws, between which said wire extends, mounted on said base member, said wire-gripping jaws normally being open wtih respect to the wire extending therebetween; wire-receiving jaws mounted on the other end of said base member for receiving the free end of said wire; a slide reciprocably mounted on said base member; wire-feeding jaws, between which the wire extends, mounted on said slide, said wire-feeding jaws being located between said wire-gripping jaws and said wire-receiving jaws; a wire-guiding tube, through which the wire extends, mounted on said slide and disposed between said wire-feeding jaws and said wire-receiving jaws; means for advancing said slide whereby said wire-feeding jaws mounted thereon advance the wire held therebetween and the free end of the wire projecting from said wire-guiding tube is presented to said wire-receiving jaws; and means, actuated by and during the advancement of said slide, for momentarily closing said wire-gripping jaws on the wire extending therebetween whereby the advancement of said wire through said wire-gripping jaws is momentarily retarded and the segment of wire between the wire-gripping jaws and the wire-feeding jaws is thereby stretched.

3. Wire feeding apparatus comprising: a base member; wire-gripping jaws, between which said wire extends, mounted on said base member, said wire-gripping jaws normally being open with respect to the wire extending therebetween; wire-receiving jaws mounted on the other end of said base member for receiving the free end of said wire; a slide reciprocably mounted on said base member; wire-feeding jaws, between which the wire extends, mounted on said slide, said wire-feeding jaws being located between said wire-gripping jaws and said wire-receiving jaws; wire-cutting means supported on said base member and disposed between said wire-feeding jaws and said wire-receiving jaws, said wire-cutting means being normally disposed to permit the passage of wire therethrough; means for advancing said slide whereby said wire-feeding jaws mounted thereon advance the wire held therebetween through said wire-cutting means and present the free end thereof to said wire-receiving jaws; means, actuated by and during the advancement of said slide, for momentarily closing said wire-gripping jaws on the wire extending therebetween whereby the advancement of said wire through said wire-gripping jaws is momentarily retarded and the segment of wire between the wire-gripping jaws and the wire-feeding jaws is thereby stretched; and means for actuating said wire-cutting means whereby the length of wire fed therethrough is severed from the supply thereof.

4. Wire feeding apparatus comprising: a base member; wire-gripping jaws, between which said wire extends, mounted on said base member, said wire-gripping jaws normally being open with respect to the wire extending therebetween; wire-receiving jaws mounted on the other end of said base member for receiving the free end of said wire; a slide reciprocably mounted on said base member; wire-feeding jaws, between which the wire extends, mounted on said slide, said wire-feeding jaws being located between said wire-gripping jaws and said wire-receiving jaws; wire-cutting means supported on said base member and disposed between said wire-feeding jaws and said wire-receiving jaws, said wire-cutting means being normally disposed to permit the passage of wire therethrough; means for advancing said slide whereby said wire-feeding jaws mounted thereon advance the wire held therebetween through said wire-cutting means and present the free end thereof to said wire-receiving jaws; means, actuated by and during the advancement of said slide, for momentarily closing said wire-gripping jaws on the wire extending therebetween whereby the advancement of said wire through said wire-gripping jaws is momentarily retarded and the segment of wire between the wire-gripping jaws and the wire-feeding jaws is thereby stretched; a wire-supporting member; means for moving said wire-supporting member into supporting engagement with the wire between the wire-cutting means and the wire-receiving jaws after it has been fed as aforesaid; and means for subsequently actuating said wire-cutting means whereby the length of wire fed therethrough is severed from the supply thereof.

References Cited in the file of this patent

UNITED STATES PATENTS

| | | |
|---|---|---|
| 1,947,449 | Anderson et al. | Feb. 20, 1934 |
| 2,181,288 | Washburn | Nov. 28, 1939 |
| 2,380,320 | La France | July 10, 1945 |
| 2,480,677 | Sheffield | Aug. 30, 1949 |
| 2,578,216 | Young | Dec. 11, 1951 |
| 2,712,835 | Sampatacos et al. | July 12, 1955 |
| 2,872,949 | Reiter et al. | Feb. 10, 1959 |
| 2,911,014 | Van Nest | Nov. 3, 1959 |
| 2,938,549 | Rangabe et al. | May 31, 1960 |

FOREIGN PATENTS

| | | |
|---|---|---|
| 687,094 | Great Britain | Feb. 4, 1953 |